United States Patent
Chang et al.

(10) Patent No.: US 6,809,436 B2
(45) Date of Patent: Oct. 26, 2004

(54) MICROACTUATOR HAVING A FERROMAGNETIC SUBSTRATE

(75) Inventors: Shih-Chia Chang, Bloomfield Hills, MI (US); Marie I. Harrington, Troy, MI (US); David Sturge Eddy, Washington, MI (US); Michael W. Putty, Eastpointe, MI (US); Jeffrey M Kempisty, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/389,461

(22) Filed: Mar. 14, 2003

(65) Prior Publication Data

US 2004/0189106 A1 Sep. 30, 2004

(51) Int. Cl.[7] .................................................. H02N 1/00
(52) U.S. Cl. ................................ 310/40 MM; 310/309
(58) Field of Search ..................... 310/40 MM, DIG. 6, 310/179, 208, 216–218, 254, 258, 259, 30, 12–15, 17, 23, 24, 34; 29/605, 606

(56) References Cited

U.S. PATENT DOCUMENTS

| | | | | |
|---|---|---|---|---|
| 5,113,100 A | * | 5/1992 | Taghezout | 310/40 MM |
| 5,412,265 A | * | 5/1995 | Sickafus | 310/40 MM |
| 5,685,062 A | * | 11/1997 | McCarthy et al. | 29/598 |
| 5,955,800 A | * | 9/1999 | Shearwood et al. | 310/40 MM |
| 6,226,149 B1 | * | 5/2001 | Dill et al. | 360/126 |
| 6,303,008 B1 | | 10/2001 | Pichulo et al. | 204/192.15 |
| 6,333,841 B1 | * | 12/2001 | Sasaki | 360/317 |
| 6,402,906 B1 | | 6/2002 | Pichulo et al. | 204/192.15 |
| 6,454,913 B1 | | 9/2002 | Rasmussen et al. | 204/192.15 |
| 6,464,844 B1 | | 10/2002 | Pichulo et al. | 204/192.15 |
| 6,592,724 B1 | | 7/2003 | Rasmussen et al. | 204/192.15 |
| 6,596,132 B1 | | 7/2003 | Rasmussen et al. | 204/192.15 |
| 6,622,371 B2 | * | 9/2003 | Sasaki | 29/603.14 |

* cited by examiner

*Primary Examiner*—Dang Le
(74) *Attorney, Agent, or Firm*—Jimmy L. Funke

(57) ABSTRACT

An electromagnetic microactuator having a ferromagnetic substrate, preferably steel. A plurality of layers are deposited upon the substrate including an insulating layer, a seed layer and first and second photoresist layers. The first photoresist layer provides a coil well which defines the deposition location of a coil metal. The second photoresist layer provides central and peripheral core wells which define the deposition locations of a central core and a peripheral core, respectively. The second photoresist layer intersticially fills and protectively covers the coil.

9 Claims, 6 Drawing Sheets

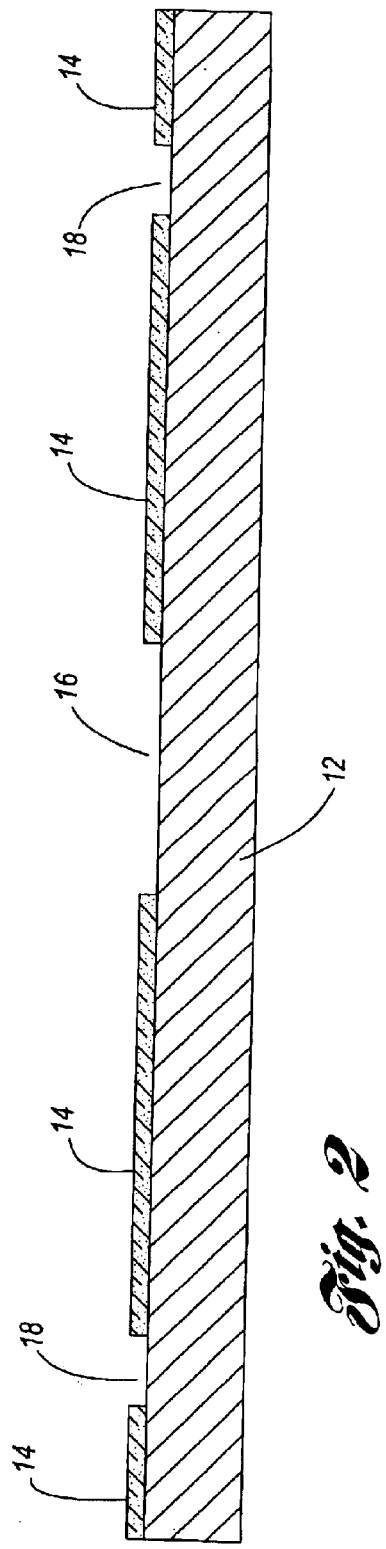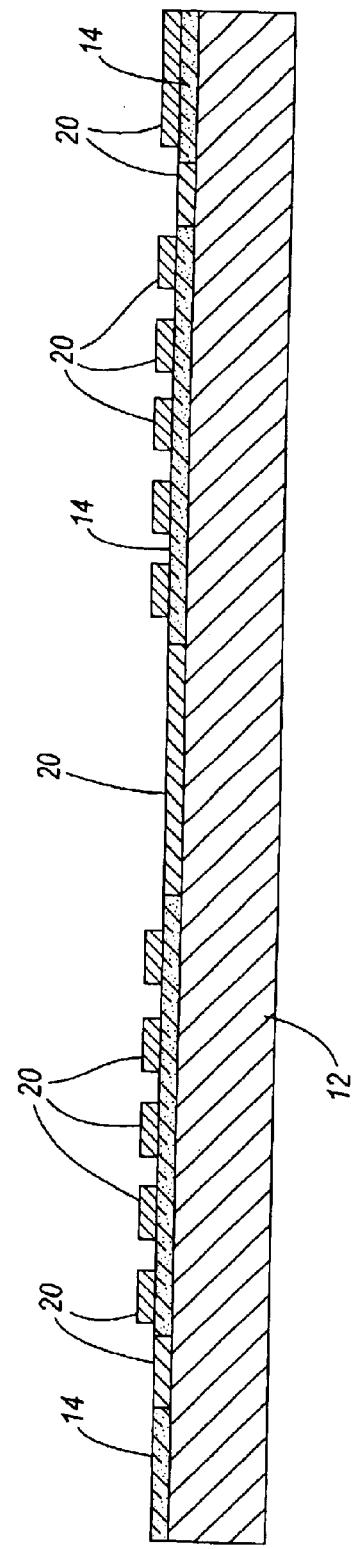

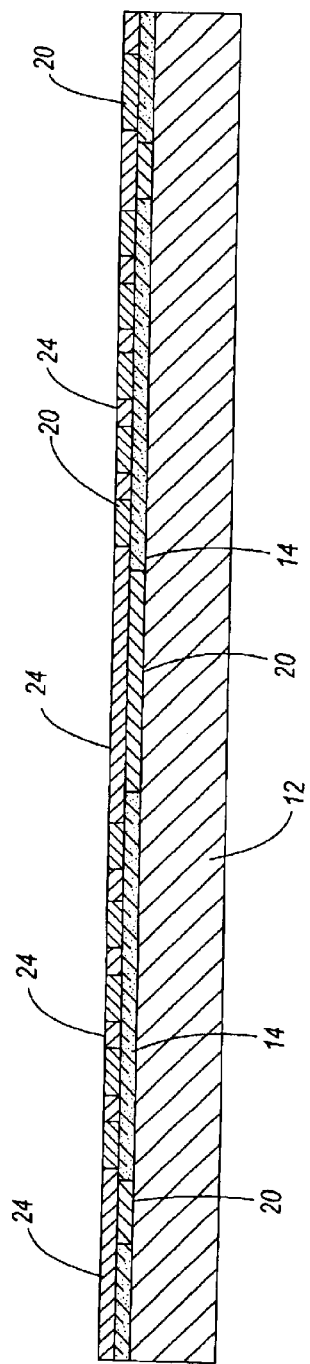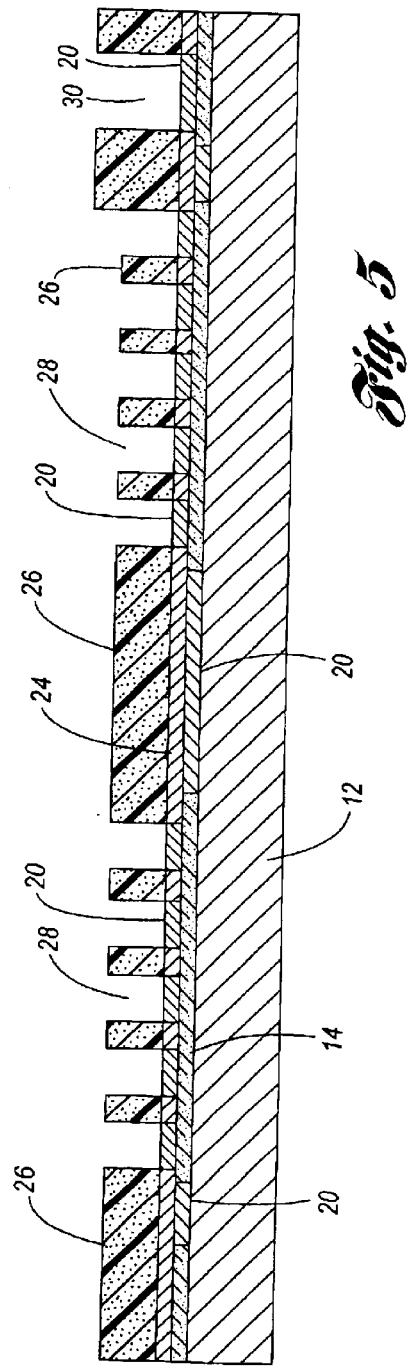

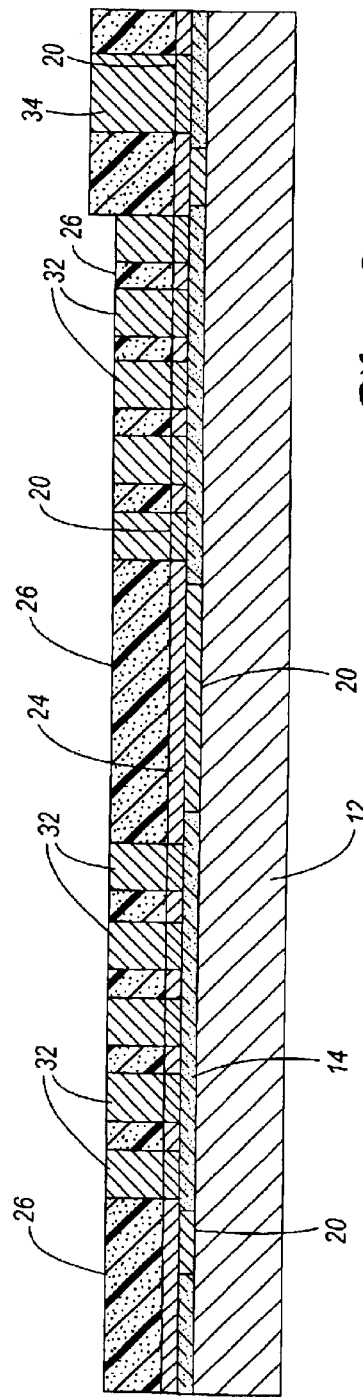
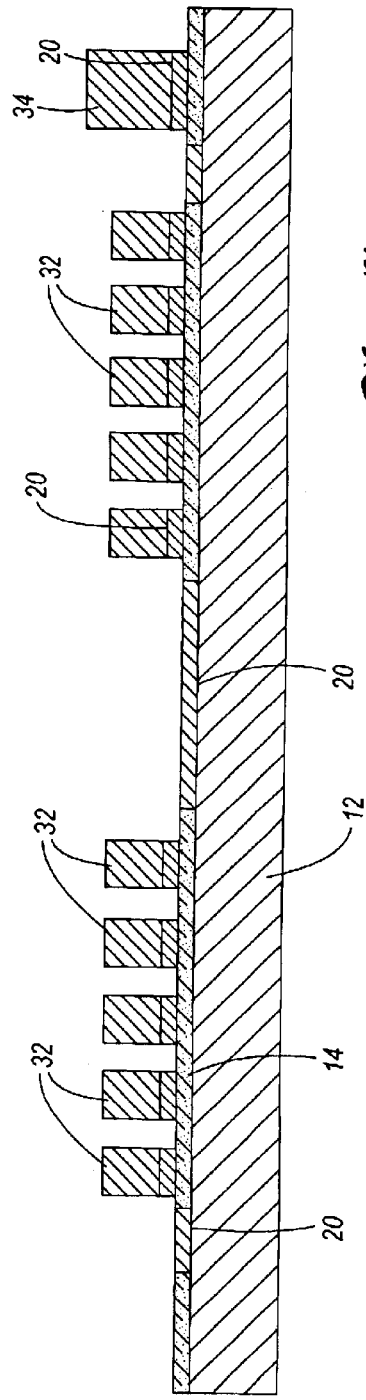

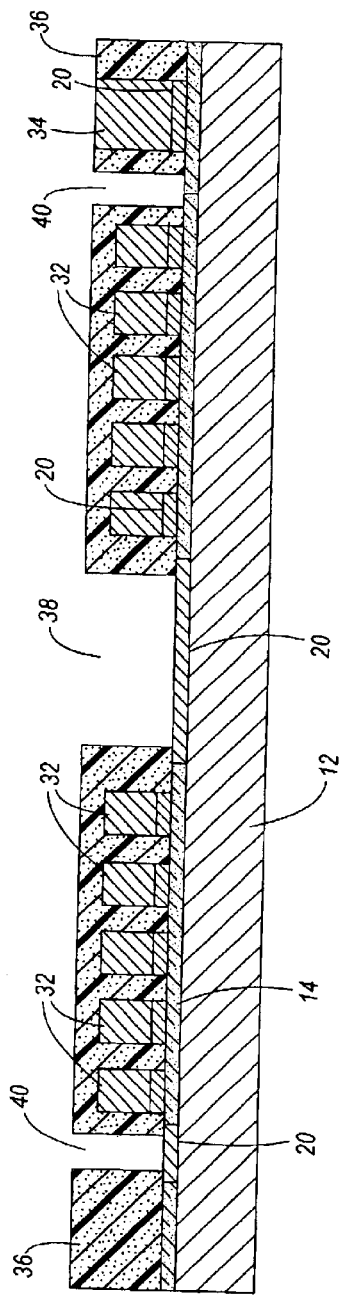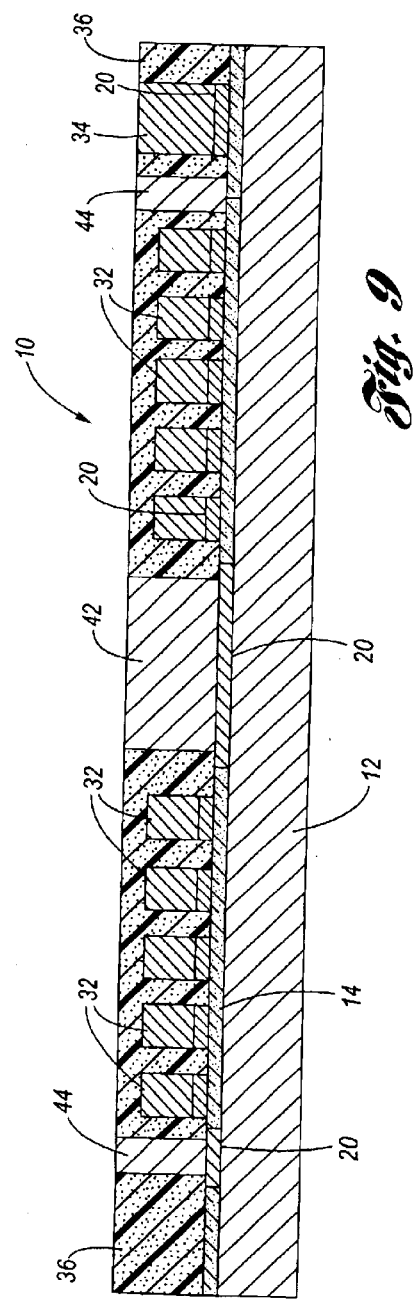

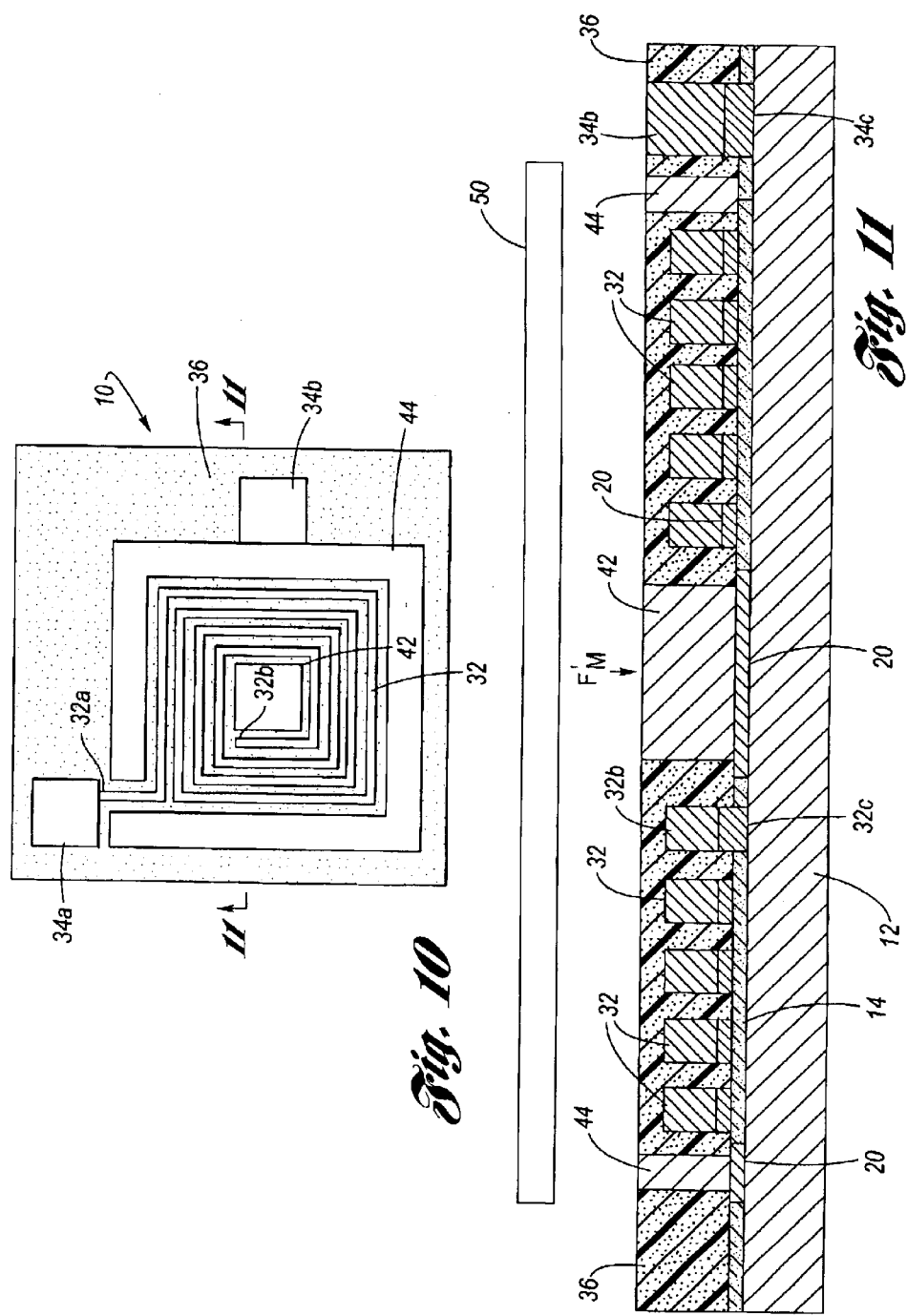

US 6,809,436 B2

MICROACTUATOR HAVING A FERROMAGNETIC SUBSTRATE

TECHNICAL FIELD

The present invention relates generally to microactuators and more specifically to an electromagnetic microactuator having a ferromagnetic substrate and a method for making same.

BACKGROUND OF THE INVENTION

There are a variety of microactuators in the art based on electrostatic, thermal mechanical, piezoelectric, shape memory alloy or electromagnetic actuation principles. For automotive applications, microactuators are required to have large displacement (in the tens of micrometers), wide operational temperatures (from minus 40 to plus 125 degrees Celsius) and low operational voltages (12V). Under such requirements, electromagnetic actuation is the best choice. An electromagnetic microactuator includes an inductive component that generates a magnetic flux and a magnetic core to guide the magnetic flux. Construction of electromagnetic microactuators include the use of AZ400 series positive photoresists or photosensitive polyimide to form the plating mold. However, the AZ400 phtotoresist has an aspect ratio of less than 3 and poor planarization.

Silicon wafers are used as a substrate for electromagnetic microactuators. Using a silicon wafer as the substrate requires a long processing time. Five hours is required for a 300 micrometer deep cavity, and electroplating of the bottom return core takes 10 hours for 300 micrometer thick permalloy. There is also a large thermal expansion coefficient mismatch among the copper, permalloy and silicon components. The thermal expansion coefficients of copper, permalloy and silicon are 17, 15 and 3 ppm/degree Celsius, respectively. The differences in thermal expansion may cause difficulties in device fabrication and have a detrimental effect on device performance.

By way of instructive example, FIG. 1 shows a prior art silicon-type electromagnetic microactuator 100 fabricated with a silicon wafer substrate 102. The electromagnetic microactuator 100 further includes a center core 104, a peripheral core 106, a spiraling copper coil 108 and terminal pads 110 connected to the coil ends. The silicon substrate 102 has a cavity 112 formed therein whereat is located a flux return path core 114 fabricated from nickel-iron. A silicon dioxide layer 116 is formed on the silicon substrate 102 before application of the center core 104, the peripheral core 106, the copper coil 108 and the terminal pads 110. The center core 104, the peripheral core 106, the copper coil 108 and the terminal pads 110 are formed on the silicon dioxide layer 116 with microelectroforming techniques. The center and peripheral cores are fabricated from nickel/iron. An SU-8 masking material 118 is also used. A ferromagnetic plate-shaped armature 120 is disposed adjacent the electromagnetic microactuator 100. When electrical current is run through the copper coil 108, magnetic flux is generated in the center and peripheral cores in cooperation with the return flux path core 114, resulting in an attractive magnetic force $F_M$ applied to the armature 120. This magnetic force causes the armature to move toward the electromagnetic microactuator 100, overcoming opposed biasing (as for example by a return spring).

SUMMARY OF THE INVENTION

The present invention is an electromagnetic microactuator having a ferromagnetic substrate and a method for making same, which provides better planarization and aspect ratios than that of the prior art, and further simplifies fabrication.

The method of fabrication of an electromagnetic microactuator according to the present invention includes a ferromagnetic substrate (base), preferably steel, and a plurality of mask deposited layers.

A first processing step includes a spin coat of spin-on-glass upon the substrate, patterned using a contact mask. A second processing step includes depositing a seed layer of titanium-tungsten-gold, patterned using an anchor mask. A third processing step includes depositing a sacrificial layer of chromium-aluminum, patterned using a plating mask. A fourth processing step includes a spin coat of an SU-8 photoresist first mold layer, patterned using a copper coil mask. A fifth processing step includes electroplating with copper. A sixth processing step includes stripping the SU-8 photoresist first mold layer with plasma etching. A seventh processing step includes stripping the sacrificial layer by an etching solution, an eighth processing step includes a spin coat of an SU-8 photoresist second mold layer, patterned using a core mask, which intersticially fills and covers the coil. A ninth and final processing step includes electroplating center and peripheral nickel-iron cores.

Accordingly, it is an object of the present invention to provide a method for fabrication of an electromagnetic microactuator, which simplifies fabrication by utilization of a ferromagnetic substrate.

This and additional objects, features and advantages of the present invention will become clearer from the following specification of a preferred embodiment.

BRIEF DESCRIPTION OF THE DRAWINGS

FIG. 2 is a cross-sectional view of a microactuator according to the present invention at a first step of fabrication, showing a ferromagnetic substrate with a layer of spin-on glass.

FIG. 3 is a cross-sectional view of the microactuator according to the present invention at a second step of fabrication involving a seed layer of deposited titanium-tungsten-gold.

FIG. 4 is a cross-sectional view of the microactuator according to the present invention at a third step of fabrication involving a deposited sacrificial layer of chromium-aluminum.

FIG. 5 is a cross-sectional view of the microactuator according to the present invention at a fourth step of fabrication involving a spin coated SU-8 photoresist first mold.

FIG. 6 is a cross-sectional view of the microactuator according to the present invention at a fifth step of fabrication involving copper electroplated into the SU-8 photoresist first mold.

FIG. 7 is a cross-sectional view of the microactuator according to the present invention after a sixth step of fabrication involving removal of the SU-8 photoresist first mold and at a seventh step of fabrication involving removal of the sacrificial layer.

FIG. 8 is a cross-sectional view of microactuator according to the present invention at an eighth step of fabrication involving spin-coating and patterning a SU-8 photoresist second mold.

FIG. 9 is a cross-sectional view of the microactuator according to the present invention at a ninth step of fabrication involving deposition of nickel-iron central and peripheral cores.

FIG. 10 is a top view of a ferromagnetic substrate electromagnetic microactuator according to the present invention fabricated according to the steps of FIGS. 2 through 9.

FIG. 11 is a cross-sectional view of the electromagnetic microactuator, seen along line 11—11 of FIG. 10.

DESCRIPTION OF THE PREFERRED EMBODIMENT

Figure 1:
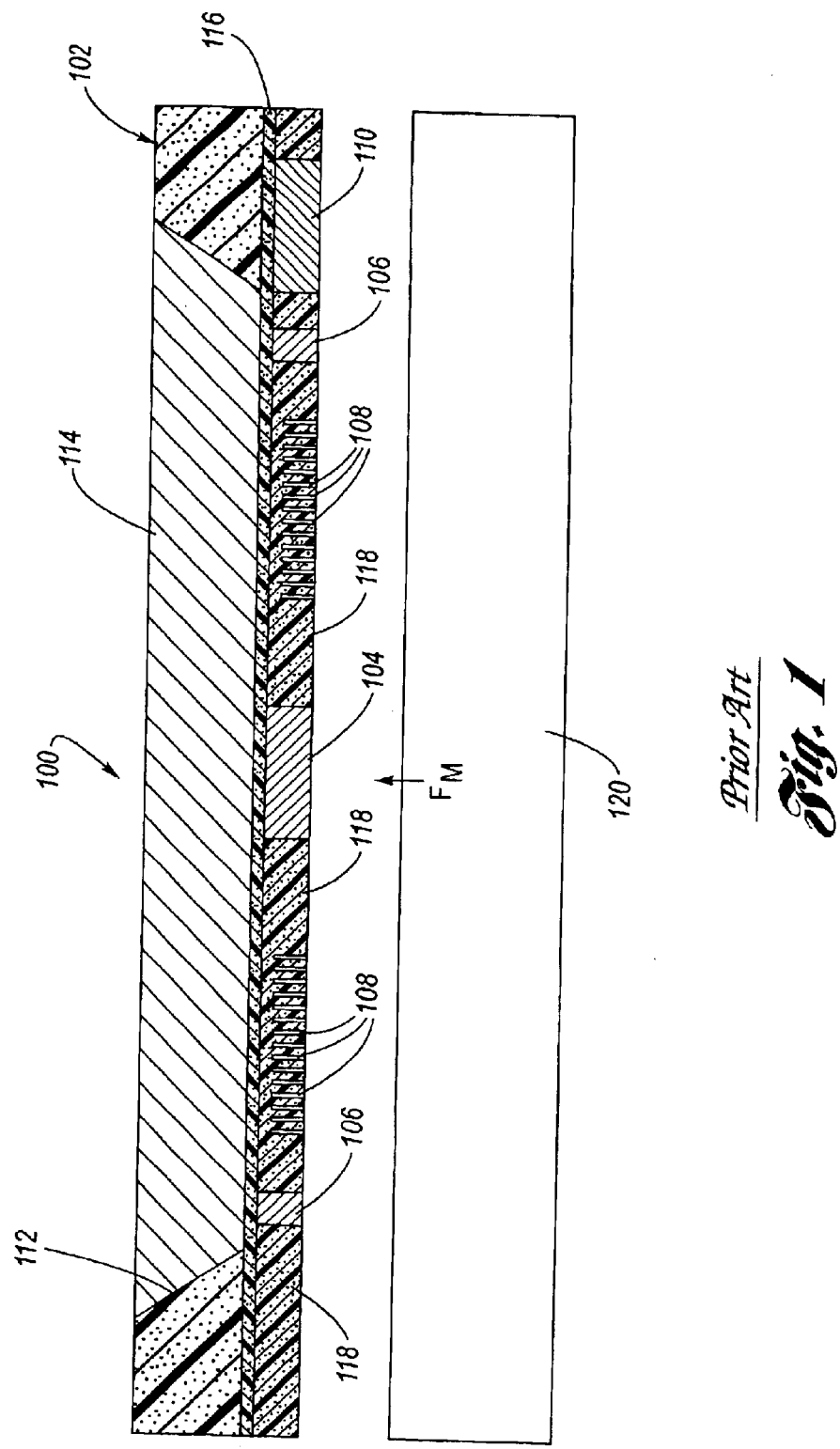
FIG. 1 is a cross-sectional view of a prior art electromagnetic microactuator fabricated on a silicon wafer adjacent a ferromagnetic plate-shaped armature.

Referring now to the Drawings, FIGS. 10 and 11 depict an example of an electromagnetic microactuator 10 according to the present invention, and FIGS. 2 through 9 depict fabrication steps for the microactuator.

The method for fabrication of the electromagnetic microactuator 10 includes providing a ferromagnetic substrate 12 and depositing a plurality of masked layers thereupon. The ferromagnetic substrate serves as a return flux path core and is preferably fabricated from steel, but other materials having ferromagnetic properties may also be used.

FIG. 2 shows a first processing step for forming the electromagnetic microactuator 10. A spin-on-glass insulating layer 14 is spin-coated and patterned onto the ferromagnetic substrate 12 using a contact mask (not shown). The insulating layer 14 preferably has a thickness of 1.8 micrometers. The contact mask leaves a central well 16 and a peripheral well 18. Preferably, the spin coating process of the insulating layer 14 includes the following attributes. The spin coating is preferably applied at a spin speed of 2000 rpm for 30 seconds. The spin-on-glass is heat treated with a hot plate in air at 90 degrees Celsius for a period of 2 minutes; at 150 degrees Celsius for a period of 2 minutes; and at 250 degrees Celsius for a period of 2 minutes. The spin-on-glass is preferably patterned photolithographically and etched with a buffered hydrofluoric acid. However, other methods of applying the spin-on-glass to the substrate 12 may also be used and other insulating layers other than spin-on-glass may also be used.

FIG. 3 shows a second processing step for forming the electromagnetic microactuator 10. A seed layer 20 of titanium-tungsten-gold is deposited and patterned using an anchor mask (not shown). The seed layer 20 is preferably deposited by a sputtering method and patterned photolithographically. The gold is preferably etched with a commercially available wet chemical solution and the titanium-tungsten is preferably etched with 50 degree Celsius hydrogen peroxide. However, other methods of applying the seed layer 20 may also be used and other seed layers having a different compositions may also be used.

FIG. 4 shows a third processing step for forming the electromagnetic microactuator 10. A sacrificial layer 24 of chromium-aluminum 24 is deposited and patterned using a plating mask (not shown). The sacrificial layer 24 is preferably deposited using E-beam evaporation, patterned photolithographically and etched by a commercially available wet chemical solution. However, other compositions and deposition methods may be used for the sacrificial layer.

FIG. 5 shows a fourth processing step for forming the electromagnetic microactuator 10. An SU-8 photoresist first mold layer 26 is applied to the sacrificial layer 24 and patterned using a copper coil mask (not shown). The SU-8 photoresist first mold layer 26 serves to define a spiraling coil well 28 and two terminal pad wells 30 (only one terminal well being shown for purposes of clarity). The SU-8 photoresist first mold layer 26 is preferably applied by spin coat at a spin speed of 950 rpm for 20 seconds to obtain an approximate 60 micrometer thickness. The SU-8 photoresist first mold layer 26 is preferably pre-baked in air on a hot plate at 93 degrees Celsius for 18 minutes, preferably exposed to ultraviolet light at an intensity of 10 mW/cm$^2$ for 120 seconds, preferably post baked on a hot plate at 95 degrees Celsius for 8 minutes, and, finally, preferably developed with a spin-spray system for 4 minutes and nitrogen dried for 1 minute.

FIG. 6 shows a fifth processing step for forming the electromagnetic microactuator 10. A conductive coil 32 and first and second terminal pads 34a, 34b (as shown in FIG. 10) are preferably formed by electroplating copper into the coil well 28 and the terminal pad wells 30, respectively. The first and second terminal pads 34a, 34b have a greater height than the conductive coil 32 due to the feature size dependent of electroplating rate. The greater height of the two terminal pads 34 is a benefit for soldering thereto external circuit leads. The copper electroplating is preferably implemented using the following substeps and parameters. The plating solution is a copper sulfate based acid having a temperature of 25 degrees Celsius. The plating rate is 20 micrometers/hour. The plating current is approximately 0.4 amperes. The plating solution is agitated by a magnetic bar stirrer. However, other electrically conductive metals may be used other than copper.

The first terminal pad 34a is electrically connected to an outer end 32a of the coil 32. The second terminal pad 34b is electrically connected to an inner end 32b of the coil 32 via the conductivity steel substrate 12. The connection of the inner end 32b to the second terminal pad 34b can be understood by reference to FIG. 11, which shows that the second process step included depositing the seed layer 20 at locally raised connection locations 32c, 34c and serves as an electrically conductive connection between the inner end 32b and the substrate 12 and between the terminal pad 34b and the substrate.

FIG. 7 shows sixth and seventh processing steps for forming the electromagnetic microactuator 10. In the sixth step, the SU-8 photoresist first mold layer 26 is stripped off, preferably using plasma etching. In the seventh step, the sacrificial layer 24 is stripped off, preferably using selective etching. The etching is preferably implemented using the following substeps and parameters. Sixth step plasma etching is implemented with 250 watts of power, an etch rate of 1 micrometer/min and with an $O_2/C_2F_6$ etching gas at a flow rate of 100/25 sccm. The selective etching of the seventh step is implemented with a solution of potassium ferricyanide.

FIG. 8 shows an eighth processing step for forming the electromagnetic microactuator 10. An SU-8 photoresist second mold layer 36 is spin-coated and photolithographically patterned with a core mask (not shown) to form a central core well 38 and a peripheral core well 40.

FIG. 9 shows a ninth and final processing step for forming the electromagnetic microactuator 10. The central core well 38 is electroplated with nickel iron to form a center core 42 and the peripheral core well 40 is electroplated with nickel/iron to form a peripheral core 44. The electroplating of nickel/iron is preferably implemented using the following substeps and parameters. The plating bath is an IBM paddle cell, and the plating solution is a nickel sulfate and iron sulfate based solution having a pH of approximately 2.8. The plating solution temperature is approximately 25 degrees Celsius; the plating current is 0.5 amperes; and the plating rate is 8 micrometers/hour.

FIG. 10 shows a top plan view of the electromagnetic microactuator 10 fabricated according to the above recounted process steps. FIG. 11 is a cross-sectional view showing in particular the electrical connection of the second terminal pad 34b with the inner end 32b of the coil 32 via the substrate 12. FIG. 11 also shows how the SU-8 photoresist 36 intersticially fills and protectively covers the coil 32 in a protective manner. As can further be seen from FIG. 11, when the coil 32 is energized, the resulting magnetic field applies an attractive force $F_M'$ upon an adjacent ferromagnetic plate armature 50, wherein return flux passes through the central core 42, the peripheral core 44 and the substrate 12.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An electromagnetic microactuator, comprising:
   a ferromagnetic substrate;
   an insulating layer selectively located on said substrate;
   a metallic seed layer selectively located on said substrate and said insulating layer;
   a coil of electrically conductive material located on said seed layer, said coil having a spiral shape defining a center and an outer periphery;
   a central core of ferrous material located on said seed layer at said center of said coil; and
   a peripheral core of ferrous material located on said seed layer adjacent said outer periphery of said coil.

2. The microactuator of claim 1, wherein said substrate comprises steel.

3. The microactuator of claim 1, further comprising a photoresist intersticially filling and covering said coil.

4. The microactuator of claim 1, wherein said insulating layer comprises a glass; and wherein said seed layer comprises titanium-tungsten-gold.

5. The microactuator of claim 1, wherein said central and peripheral cores comprise nickel-iron; and wherein said coil comprises copper.

6. The microactuator of claim 2, wherein said insulating layer comprises a glass; and wherein said seed layer comprises titanium-tungsten-gold.

7. The microactuator of claim 6, wherein said central and peripheral cores comprise nickel-iron; and wherein said coil comprises copper.

8. The microactuator of claim 7, further comprising a photoresist intersticially fills and covers said coil.

9. The microactuator of claim 8, wherein said coil has an outer end and an inner end; further comprising at least one terminal pad respectively connected to each of said outer and inner ends of said coil.

* * * * *